Sept. 3, 1968  R. T. BECKER ET AL  3,400,230
ELECTRIC CABLE REEL

Filed Aug. 25, 1966  6 Sheets—Sheet 1

INVENTORS
ROGER T. BECKER &
WILLIAM K. BECKER
BY
Woodhams, Blanchard & Flynn
ATTORNEYS

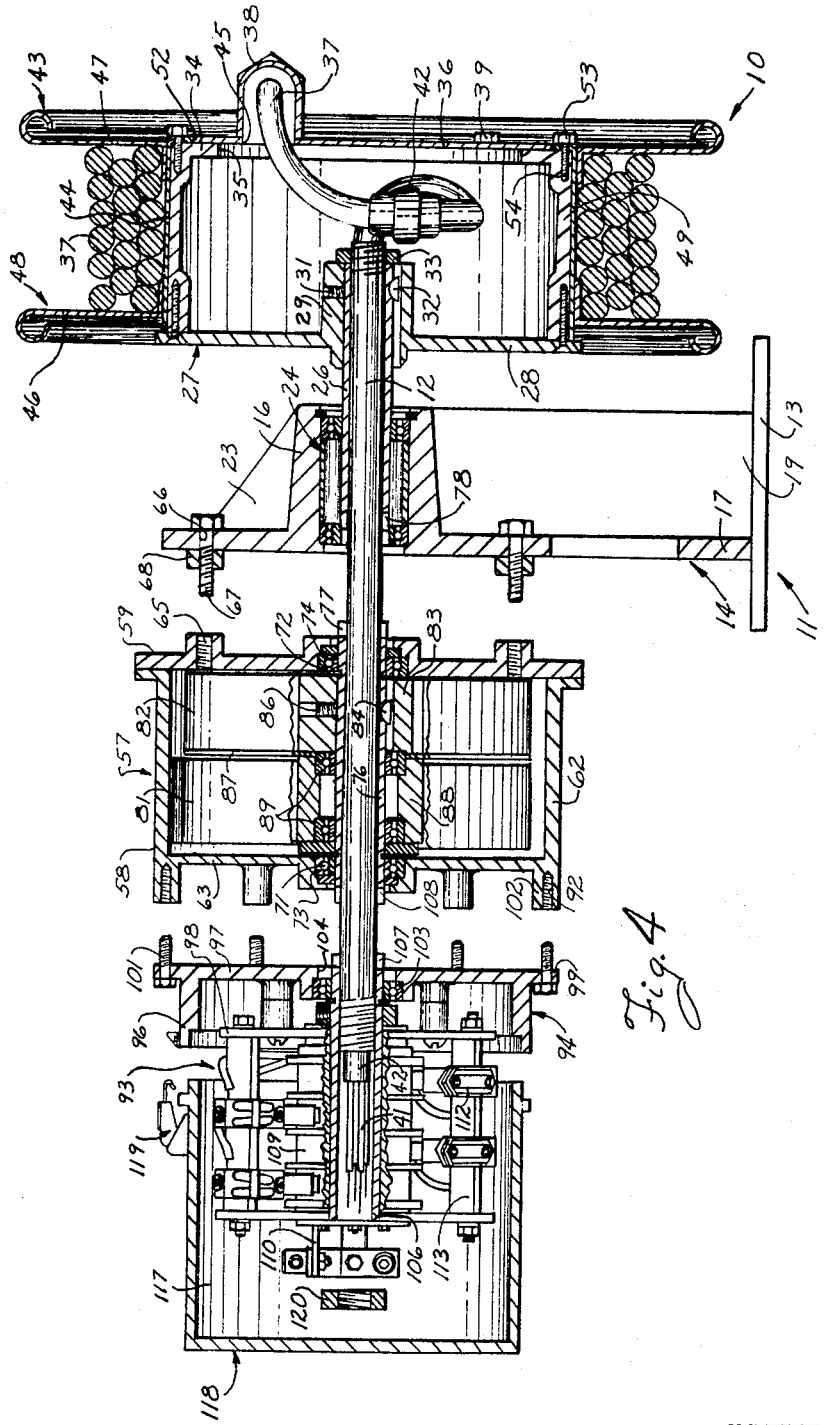

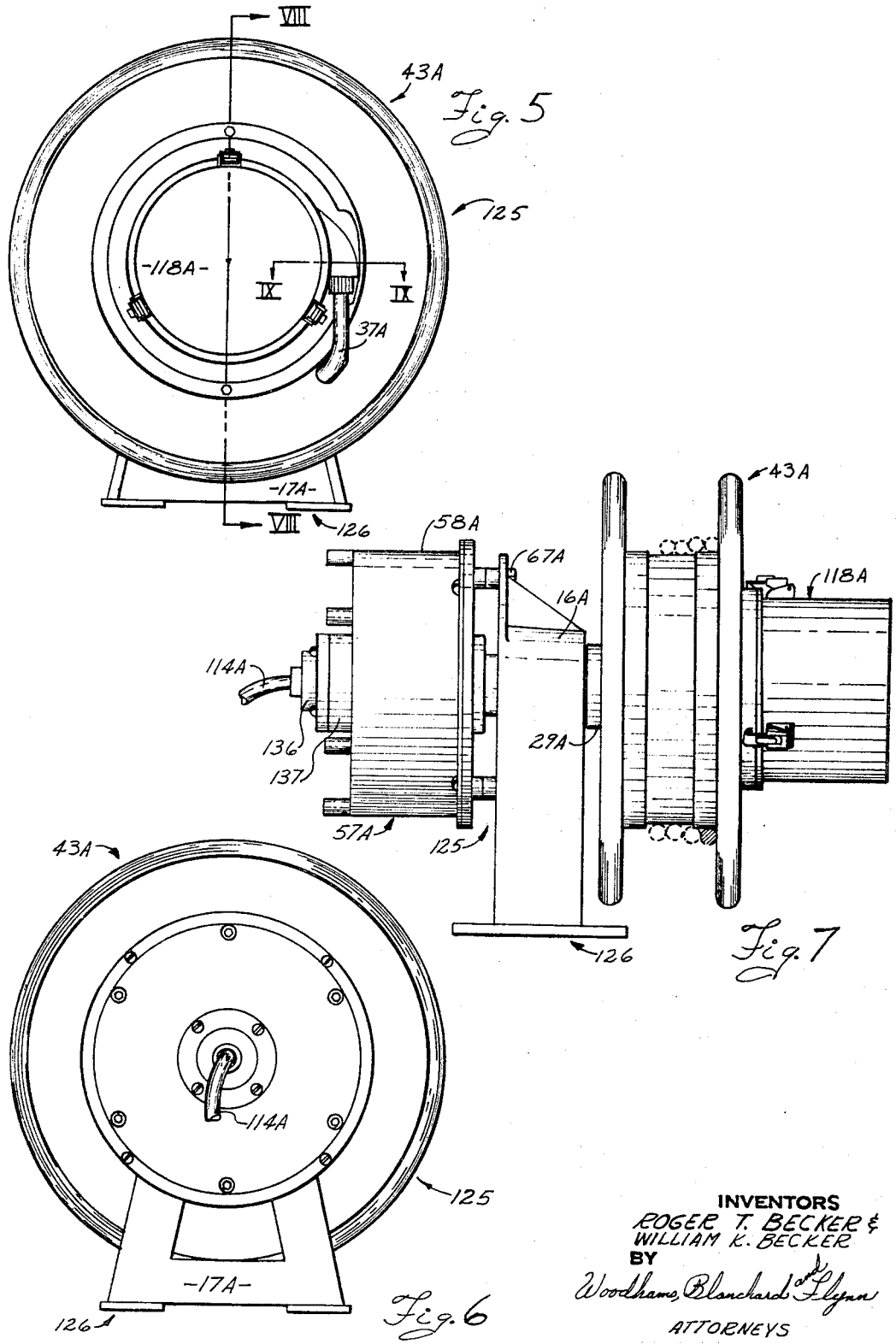

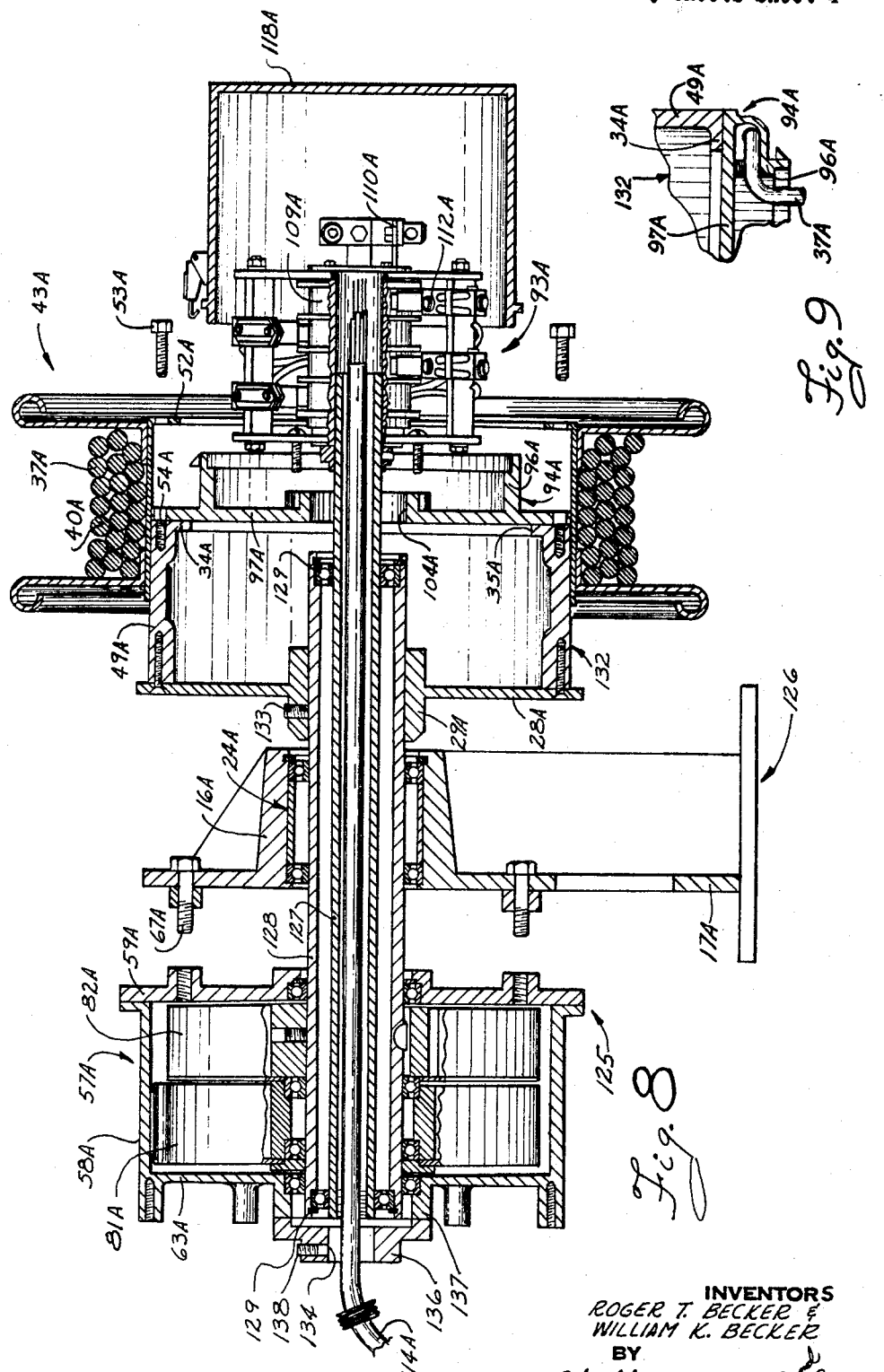

Sept. 3, 1968    R. T. BECKER ET AL    3,400,230
ELECTRIC CABLE REEL

Filed Aug. 25, 1966    6 Sheets-Sheet 6

INVENTORS
ROGER T. BECKER &
WILLIAM K. BECKER
BY
Woodhams, Blanchard & Flynn
ATTORNEYS

United States Patent Office 3,400,230
Patented Sept. 3, 1968

3,400,230
ELECTRIC CABLE REEL
Roger T. Becker, Kalamazoo, and William K. Becker, Ross Township, Kalamazoo County, Mich., assignors to Aero-Motive Manufacturing Company, Kalamazoo, Mich., a corporation of Michigan
Filed Aug. 25, 1966, Ser. No. 575,107
7 Claims. (Cl. 191—12.2)

ABSTRACT OF THE DISCLOSURE

A reel construction comprising a plurality of components capable of quick and easy assembly or disassembly for replacement, such components including a base, a pair of telescoped shafts, a spool, a spring motor and a collector ring assembly.

---

This invention relates in general to an electric cable reel having a motor for continuously and yieldably resisting unwinding of the cable from the cable drum and, more particularly, to a type of cable reel wherein the major components, such as the shaft, the reel drum, the motor and a collector ring assembly are quickly and easily attached to or removed from a base structure.

Motor driven reels have been successively and beneficially used for many years in a wide variety of industrial applications, and especially in association with equipment which requires electrical energy and must be frequently moved substantial distances with respect to the source of such energy. Such equipment often demands high potentials so that heavy conductors and collector ring assemblies must be provided in the reel structure. Also, electric cable reels of the larger sizes are often used where they are exposed to relatively rough treatment and, therefore, receive damage which necessitates repair and/or replacement of parts thereof. With existing, electric cable reel constructions, repair or replacement of the damaged part often necessitates a substantial dismantling of the reel construction. In fact, some reels are constructed so that the entire reel construction must be replaced even though only a minor part thereof has been damaged. That is, the component parts of existing reel structures are generally assembled so that one part cannot be removed from the other parts without requiring substantial, time-consuming dismantling of the entire reel assembly.

Electric cable reels, of the type presently in use, are usually constructed for one arrangement of assembly, which may be unsuited for a specific installation and more particularly, may unduly expose the structure to damage when it is used for such specific installation. Generally speaking, existing electric cable reel constructions for heavy-duty use have been largely patterned after the smaller electric cable reels which are usually built in one, inflexible style. Thus, in designing the electric cable reel construction disclosed herein, particular attention has been given to the provision of a reel structure having components easily adaptable to more than one arrangement of assembly.

For illustrative purposes, detailed reference is made herein to spring motors as the means for resisting unwinding rotation and effecting winding rotation of the reel drum. However, it will be recognized that other types of motor or drive means can be used while still preserving the concept of easily exchanged or rearranged component parts. It has become recognized that a heavy-duty reel having a spring motor is often subjected to severe usage so that the springs thereof are more likely to fail on relatively short notice than are the usual, relatively light-duty springs used in the smaller reels. Therefore, in designing the reel structure of the invention, ease of changing spring motors was deemed to be of particular importance.

Accordingly, the objects and purposes of the invention have been to provide:

(1) An electric cable reel construction having component parts which can be quickly and easily assembled or disassembled by maintenance persons of average skill, which component parts are capable of being assembled in various arrangements and which can be removed and replaced quickly without completely disassembling the reel construction.

(2) An electric cable reel construction, as aforesaid, which is sturdy in construction, which is particularly designed for performance under heavy-duty conditions, which requires little or no maintenance under normal operating conditions, and which is capable of operation in a substantially conventional manner so that no special instructions are required.

(3) An electric cable reel construction, as aforesaid, which can be manufactured at a cost that is not materially greater than the cost of an existing reel construction presently used for the same purpose, but lacking the improvements of the invention.

Other objects and purposes of this invention will become apparent to persons familiar with the manufacture and use of electric cable reel constructions upon reading the following descriptive material and examining the accompanying drawings, in which:

FIGURE 4 is an exploded, sectional view taken along the line IV—IV in FIGURE 1.

FIGURE 5 is a front end elevational view of a modified reel construction embodying the invention.

FIGURE 6 is a rear end elevational view of said modified reel construction.

FIGURE 7 is a side elevational view of said modified reel construction.

FIGURE 8 is an exploded, sectional view of said modified reel construction substantially as taken along the line VIII—VIII in FIGURE 5.

FIGURE 9 is a sectional view taken along the line line IX—IX in FIGURE 5.

Figure 1:
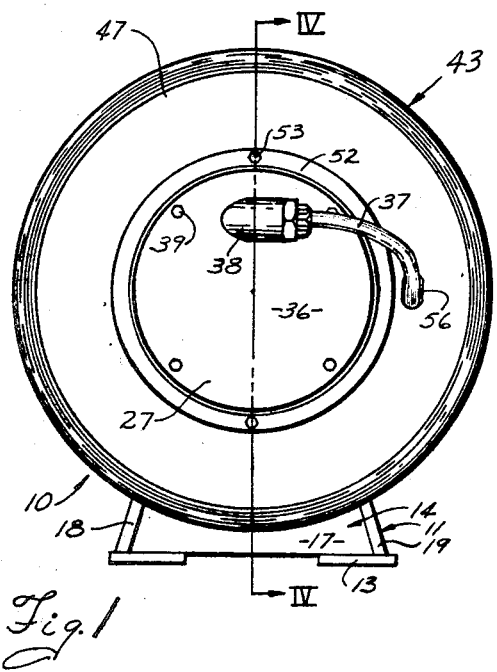
FIGURE 1 is a front end elevational view of a reel construction embodying the invention.
Figure 2:
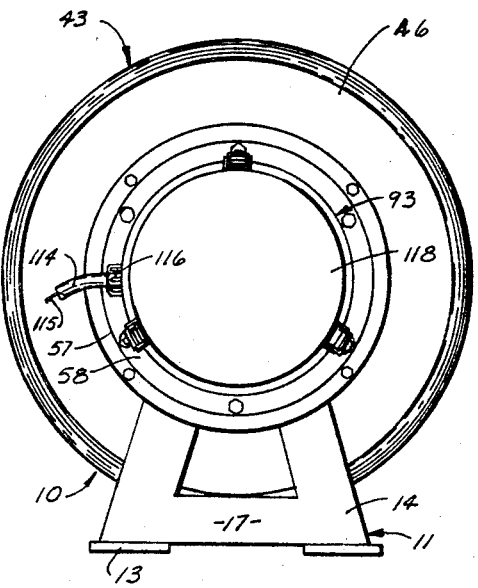
FIGURE 2 is a rear end elevational view of said reel construction.
Figure 3:
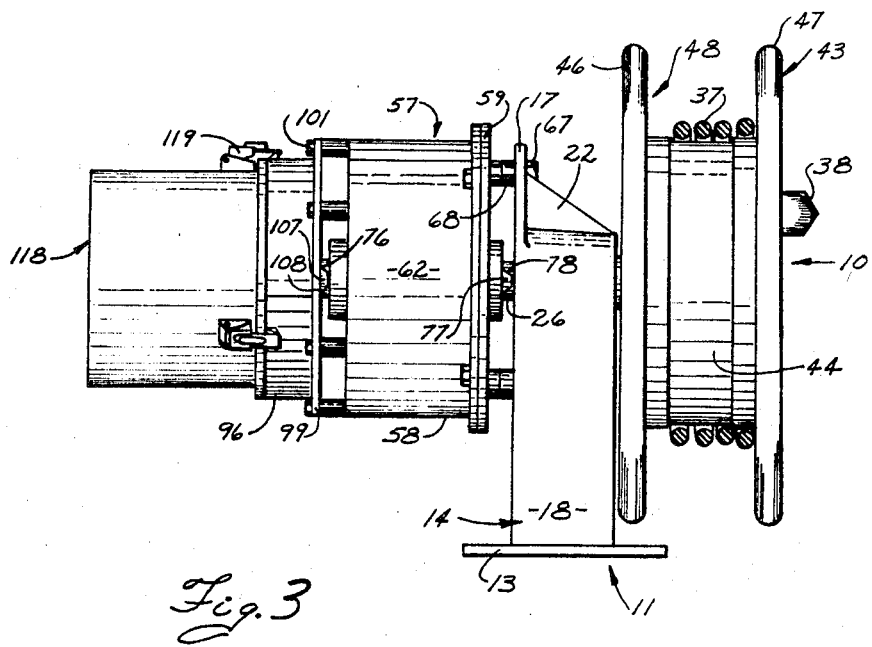
FIGURE 3 is a side elevational view of said reel construction.

For the purposes of convenience in description, the terms "upper," "lower" and words of similar import will have reference to the reel structures embodying the invention as appearing in FIGURES 1 and 5, for example. The terms "front," "rear," and words of similar import will have reference to the right and left sides, respectively, of said reel structures as appearing in FIGURES 3 and 7. The terms "inner," "outer" and derivatives thereof will have reference to the geometric center of said reel structures and parts thereof.

General construction

The objects and purposes of the invention, including those set forth above, have been met by providing a reel construction comprised of a base member rotatably supporting shaft means which extends preferably horizontally from both sides of the base member. The hub of a cable drum is secured to one end of said shaft means for rotation therewith, and a cable spool is removably mounted upon the drum. A spring motor housing is mounted upon said base member so that it concentrically encircles and rotatably engages said shaft means. Spring means disposed with in the spring housing is connected at one end to the shaft and at the other end to the housing so that it resiliently resists rotation of the cable spool in one rotational direction.

A collector ring assembly is supported within a housing which is arranged for mounting either upon the rear, outer side of the spring housing or upon the front, outer side of the drum. The shaft means is hollow so that electrical conductor means can extend therethrough. In one embodiment of the invention, the electrical conductor means which extends through the shaft means for connection to the collector ring assembly is wound upon the drum. In another embodiment of the invention, the conductor means which extends through the shaft means is connected to the source of energy.

*Detailed description*

The electric cable reel 10 (FIGURES 1 to 4), which illustrates one embodiment of the invention, is comprised of a base member 11 upon which a hollow shaft 12 is rotatably supported, preferably in a substantially horizontal position. Specifically, the base member 11 is comprised of a base plate 13 upon which an upwardly converging pedestal 14 is secured in an upright position. Said pedestal includes an axially horizontal, substantially cylindrical bearing support 16 which is preferably integral with the upper end of the rear end plate 17, from which the bearing support 16 extends frontwardly. The pedestal includes a pair of upwardly converging side plates 18 and 19, which are secured to the end plate 17, and a pair of gussets 22 and 23 which strengthen the support of the bearing support 16.

An antifriction bearing assembly 24 is disposed within the bearing support 16 for engagement with and rotatable support of a hub-supporting sleeve 26 which snugly encircles the shaft 12. Under normal operating conditions, the sleeve 26 extends from a point slightly rearwardly of the end plate 17 to a point near the rightward end of the shaft 12 which projects substantially beyond the rightward end of the bearing support 16.

A substantially cylindrical drum 27 has an inner side plate 28 with an integral, axially elongated hub 29 which is snugly, but slideably, disposed upon the sleeve 26 near the front end thereof. A set screw 31 and key device 32 releasably secure the hub 29 to the sleeve 26 to prevent relative rotation therebetween. A nut 33 is threadedly engaged with the rightward end of the shaft 12 for preventing rightward movement of the sleeve 26 and hub 29, engaged by said nut, with respect to said shaft.

The side ring 34 on the front end of the drum 27 has a central opening 35 which is covered by a front side plate 36. A junction box or connector 38 is mounted on the outer surface of the side plate 36 which is removably secured to the ring 34 of the drum 27 by means of the screws 39, to permit easy access to the connections between the conductor 37 and the conductor 42 which extends through the hollow shaft 12. The conductor 37 extends through an opening 45 in the side plate 36.

The spool 43 has a circumferential wall 44 and annular flanges 46 and 47 extending outwardly from, and secured to, said circumferential wall 44 near the opposite axial ends thereof, to define an annular cable-receiving groove 48. The circumferential wall 44 is slideably and snugly receivable onto the peripheral wall 49 of the drum 27, and and said spool 43 includes a radially inwardly extending annular flange 52 which is adjacent the annular flange 47 and which overlays the side ring 34 when the spool 43 is properly mounted upon the drum 27. Screws 53 are received through openings in the flange 52 for threaded engagement with openings 54 in the drum 27 adjacent the peripheral wall 49 for removably securing the spool 43 upon the drum 27.

The conductor 37 is of any convenient type, such as a rubber covered and protected cable, which extends through an opening 56 in the flange 47 (FIGURE 1) so that it can be wound upon the spool 43 within the groove 48, as shown in FIGURE 4.

The parts of the base member 11, shaft 12, drum 27 and spool 43 described above are preferably, but not necessarily, fabricated from metal. Some of the parts can be cast and others are more readily fabricated from sheet metal.

The spring motor 57 (FIGURE 4) includes a spring housing 58 having an inner or front end wall 59, a peripheral wall 62 and an outer or rear end wall 63, which is preferably integral with the peripheral wall 62. The removable, front end wall 59 and the end plate 17 of the pedestal 14 have aligned bolt openings 65 and 66 through which bolts 67 are received for the purpose of securing the spring housing 58 upon the base 11. The bolt openings 65 are threaded and the bolts 67 may be encircled by spacers 68 for controlling the distance between the end plate 17 and the spring housing 58.

Antifriction bearings 71 and 72 (FIGURE 4) are disposed within appropriate recesses 73 and 74 in the side walls 63 and 59, respectively, of the spring housing 58. A motor supporting sleeve 76 snugly, but slideably, encircles the shaft 12 and extends completely through said housing 58 in which it is rotatably supported by the bearings 71 and 72. The rightward end (FIGURE 3) of the sleeve 76 has teeth 77 for cooperating engagement with notches 78 in the leftward end of the sleeve 26, when the reel 10 is in its normal operating condition, to augment the strength of the shaft 12.

In this embodiment, a pair of springs 81 and 82 are disposed within the housing 58 in side-by-side relationship and in series connection. That is, the inner end of the spring 82, for example, is releasably connected to the collar 83 which in turn is secured to the sleeve 76 by the key device 84 and set screw 86. The outer end of the spring 82 is connected by means (not shown) to an annular side member 87, the radially inner edge of which is in turn secured to the collar 88 disposed within the spring 81. Said collar 88 is rotatably supported upon sleeve 76 by the bearings 89 and is connected to the inner end of the spring 81, the outer end of which is connected to the housing 58 in any convenient conventional manner. Accordingly, rotation of the sleeve 76 in at least one rotational direction is resiliently opposed by the springs 81 and 82. The number of springs placed in series can be varied to accommodate the amount of cable or conductor 37 wound on the spool 43.

The spring housing 58 has a plurality of threaded, parallel openings 92 which extend into the rear end of the peripheral wall 62. The openings 92 are preferably located at a distance from the axis of the shaft 12 equal to the corresponding distance of the openings 54 in the drum 27, and said openings 92 are axially alignable with the openings 54 for reasons appearing hereinafter.

The collector ring assembly 93 comprises a housing 94 having a short peripheral wall 96 and an integral front end wall 97. Said end wall 97 has a radial edge 99 extending radially beyond the peripheral wall 96 where it has openings through which the screws 101 are received for threaded reception into the openings 92 in the housing 58, or into the openings 54 in the drum 27. The openings 92 may be located in projections 102 which hold the collector ring assembly 93 at a selected, spaced distance from the spring housing 58. The screws 101, when extending through the radial edge 99 of the end wall 97, are also threadedly receivable into the screw openings 54 in the drum 27, if the screws 53 are removed therefrom. Thus, the collector ring housing 94 can be alternatively mounted upon either the spring housing 58 (FIGURE 4) or the drum 27 (FIGURE 8).

An antifriction bearing 103 is disposed within the central opening 104 in the end wall 97 for rotatably engaging a collector ring sleeve 106, which is slideably and snugly received upon the shaft 12. The front end of the sleeve 106 has teeth 107 which are receivable into the notches 108 in the rear end of the sleeve 76. Under some circumstances, it may be desirable to fabricate the sleeves 26, 76 and 106 from nonconductive material in order to minimize the possibility of a short circuit. Thus, said sleeves can serve to strengthen and/or insulate the shaft 12.

The collector rings 109 are supported upon the sleeve 106 and are engaged by brushes 112 supported upon the bars 113 which are mounted upon the front wall 97 by the plate 98. A detailed disclosure of collector rings and brushes of this general type and for this purpose is set forth in our Patent No. 3,197,578. The wires 41 of the conductor 42 are connected at their rearward ends to the leads 110 of the rings 109, and the brushes 112 are connected to the wires 115 of a conductor 114 (FIGURE 2) which is connectable to any convenient source of electrical energy in a conventional manner. In this embodiment, the conductor 114 extends from within the housing 94 through an outlet fixture 116 in the peripheral wall 96. A cup-shaped end cap 118 is secured to the peripheral wall 96 of the housing 94 by the fasteners 119.

The rear end of the shaft 12 is threaded to receive the nut 120 which limits rearward movement of the sleeve 106 and rings 109. Moreover, the nuts 33 and 120 hold the sleeves 26, 76 and 106 firmly in toothed engagement upon the shaft 12.

*Modified structure*

The cable reel 125 (FIGURE 8) has a base member 126 which, in general, may be substantially identical with the base member 11 except that the bearing support 16A thereof is somewhat larger than the bearing support 16 to accommodate a larger bearing assembly 24A. The shaft 127 may be substantially identical with the shaft 12, but it is concentrically and rotatably held within an outer hollow shaft 128 by the bearings 129 located near the opposite ends thereof. The outer shaft 128 is in turn rotatably supported within the bearing assembly 16A.

The drum 132, which may be substantially identical with the drum 27, has a side plate 28A secured to a hub 29A which is snugly sleeved upon the outer shaft 128 and held against rotation with respect to said shaft by the set screw 133. The spool 43A may be, and preferably is, identical with the spool 43. Thus, the spool 43A is held in place upon the peripheral wall 49A of the drum 132 by means of screws 53A which extend through suitable openings in the flange 52A and are threadedly engaged in the openings 54A. However, since the housing 94A of the collector ring assembly 93A is mounted upon the side ring 34A of the drum 132, there is no need for the side plate 36 shown in FIGURE 4. That is, the central opening 35A defined by the ring 34A is covered by the end wall 97A of the ring housing 94A.

The collector rings 109A are mounted upon the inner shaft 127, which extends beyond the front end of the outer shaft 128, and the brushes 112A are supported upon the end wall 97A of the housing 94A in a manner substantially as discussed above with respect to the corresponding parts of the collector ring assembly 93.

The conductor 114A (FIGURE 8), which is connected to a source of electrical energy (not shown), extends completely through the inner shaft 127 and its wires are connected at their front ends to the leads 110A of the collector rings 109A. The brushes 112A are connected to the wires 40A in the conductor 37A (FIGURE 5), which is wound upon the spool 43A. Said conductor 37A extends through the peripheral wall 96A of the housing 94A in a manner as described above with respect to the conductor 114 and wall 96.

The spring motor 57A (FIGURE 8) may be, and preferably is, substantially identical with the spring motor 57. Thus, spring motor 57A includes a housing 58A in which a pair of springs 81A and 82A are contained for series connection between the outer shaft 128 and the housing 58A.

When the cable reel 125 is in its normal operating condition, the front end of the outer shaft 128 is snugly and slideably disposed within the opening 104A in the end wall 97A. Also, the rear end of the inner shaft 127 is disposed within the central opening 134 in the end cap 136, which covers the rear end of the cylindrical projection 137 which is integral with the rear side wall 63A. A set screw 138 in the end cap 136 secures said end cap with respect to the inner shaft 127.

The side wall 59A of the housing 58A is rigidly secured to the end plate 17A by means of bolts 67A in substantially the same manner as set forth above with respect to the housing 58 and end plate 17.

Figure 10:
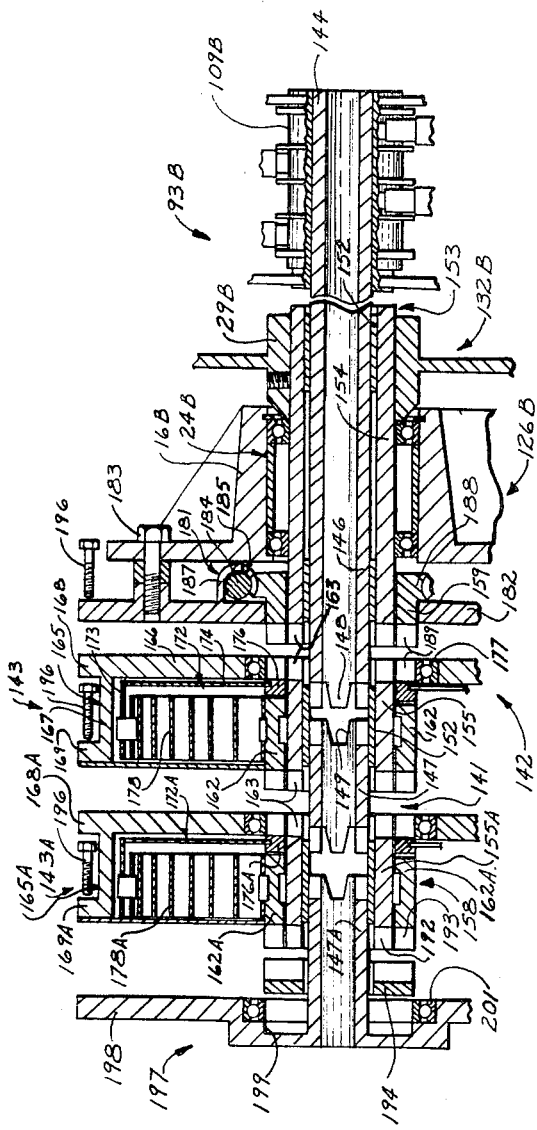
FIGURE 10 is a sectional view similar to a fragment of the sectional view appearing in FIGURE 8 and showing a modified construction.

As shown in FIGURE 10, which is a modified fragment of FIGURE 8, the shaft assembly 141 of the reel construction 142 has been constructed and arranged so that plural, interchangeable spring motors 143, 143A can be used in place of the single spring motor 57A shown in FIGURE 8. The base member 126B and its bearing support 16B may be substantially identical with the base member 126 and bearing support 16A in the FIGURE 8. Likewise, the drum 132B and the collector ring assembly 93B may be substantially identical with the drum 132 and collector ring assembly 93A in the reel 125 of FIGURE 8.

The shaft assembly 141 is comprised of a multiple piece, inner shaft 144 which is hollow and which has a bearing section 146 and two motor sections 147 and 147A. The shaft sections 146, 147 and 147A are releasably engageable for simultaneous rotation by means, for example, of the teeth 148 on one section and notches 149 on the mating end of the adjacent section. The inner shaft 144 is rotatably supported by means of sleeve bearings 152 within the intermediate shaft 153 which has a bearing section 154 and two motor sections 155 and 155A respectively sleeved upon the bearing section 146 and the motor sections 147 and 147A.

The hub 29B of the drum 132B is removably secured upon the front end of the bearing section 154 of the intermediate shaft 153, which section is rotatably supported within the bearing support 16B by the bearing assembly 24B. The collector rings 109B of the collector ring assembly 93B are rigidly mounted upon the front end of the bearing section 146 of the inner shaft 144, which projects frontwardly of the corresponding bearing section 154 of the intermediate shaft 153.

An outer shaft 158 is comprised of an adjustment section 159, which is rotatably sleeved upon the rearward end of the bearing section 154, and two motor sections 162 and 162A, which are respectively sleeved upon the motor sections 155 and 155A. The bearing and motor sections of the intermediate shaft 153 are interconnected for simultaneous rotation around the inner shaft 144 by means of tooth and notch couplings 163 on their adjacent ends.

The spring motor 143 is comprised of a housing 165 having a front wall 166 and peripheral wall 167 from which flanges 168 and 169 extend radially. A spring retainer 172, which is rotatably disposed within the housing 165, has a peripheral wall 173 and a front wall 174 which is rigidly secured to a support sleeve 176 which is rotatably mounted upon the motor section 155 of the intermediate shaft 153 and within the bearing 177 in the front wall 166 of the motor housing 165. The outer end of the coil spring 178 is connected to the peripheral wall 173 of the spring retainer 172, and the inner end of spring 178 is connected to the motor section 162 of the outer shaft 158. Accordingly, relative rotation between the support sleeve 176 and the motor section 162 will effect a change in the tension on the coil spring 178.

The spring motor 143A is preferably identical with the spring motor 143 and, therefore, has a motor housing 165A, a spring retainer 172A, with a support sleeve 176A, and a coil spring 178A.

The tension adjustment device 181 includes a mounting ring 182 rigidly secured by means of the bolts 183 to the base member 126B near to, but spaced from, the upper end thereof. An adjustment screw 184 is rotatably supported within an opening 185 in a projection 187 on the side of the ring 182 adjacent the base member 126B. The adjustment section 159 of the outer shaft 158 has at its frontward end an integral worm gear 188 engaged with the screw 184 whereby rotation of the screw 184 effects rotation of the worm gear 188, hence the adjustment section 159 with respect to the intermediate shaft 153 and the base member 126B.

The adjustment section of the outer shaft 158 and the support sleeves 176 and 176A are provided with tooth and notch couplings 189 whereby the adjustment section 159 and motor sections 162 and 162A of the said outer shaft are releasably and nonrotatably engaged with the support sleeves 176 and 176A so that the spring motors 143 and 143A are connected in series.

The rearward ends of the motor sections 155A and 162A are provided with teeth 192 and 193, respectively, for engagement with notches in the coupling collar 194, whereby the motor section 162A is releasably and nonrotatably held with respect to the motor section 155A. Hence, rotation of the drum 132B acts through the intermediate shaft 153 to increase or decrease the tension upon the motor springs 178 and 178A in the usual operational manner of a spring-actuated reel. Moreover, the tension of said motor springs can be changed as desired by rotation of the screw 184.

The motor housings 165 and 165A are rigidly connected together and to the mounting ring 182 by means of bolts 196 which extend through the flanges 168, 168A, 169 and 169A.

An end cap 197 has a radial flange 198 which is rigidly secured to the flange 169A of the motor housing 165A by bolts 196. Said end cap 197 has a concentric recess 199 into which the coupling collar 194 is slideably received for rotational support by the bearings 201. The end cap 197 is preferably integral with the motor section 147A of the inner shaft 144.

From the foregoing, it will be seen that another spring motor comprised of a motor housing, a spring retainer, an outer shaft section, an intermediate shaft section and an inner shaft section can be added to the structure appearing in FIGURE 10 merely by releasing the bolts 196 which secure the end cap 197 to the spring motor 143A. In a similar manner, one of the spring motors 143 and 143A can be quickly and easily replaced, if it should fail.

The operation of the reel construction 142, insofar as its electrical performance is concerned or its facility for changing other components thereof, will be substantially the same as set forth above with respect to the cable reel 125.

Figure 11:
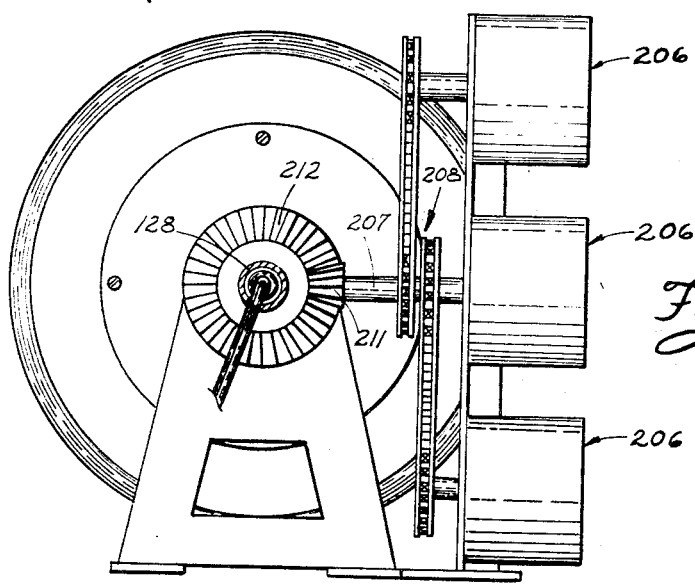
FIGURE 11 is a front end elevational view of a reel construction embodying the invention and showing a modified motor and drive assembly.

The reel structure 205 shown in FIGURE 11 may be similar to that appearing in FIGURE 8 except that the spring motor 157A of the cable reel 125 is replaced by three spring motors 206 which are connected to the drive shaft 207 of one of said spring motors by sprocket and chain devices 208. The drive shaft 207 is connected by the bevelled gears 211 and 212 to the outer shaft 128 (FIGURE 8) of a reel structure which, as stated above, may otherwise be substantially the same as the cable reel 125.

Figure 12:
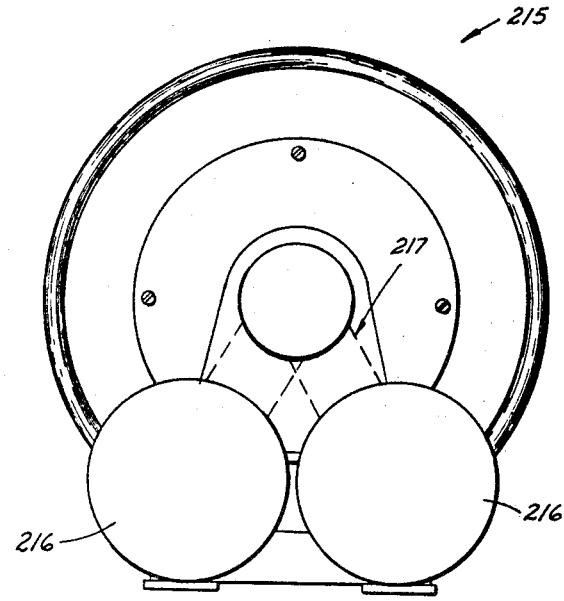
FIGURE 12 is a front end elevational view of a reel construction embodying the invention and showing a further modified motor and drive assembly.

In the reel construction 215 of FIGURE 12, a pair of spring motors 216 are connected to an outer shaft, such as the sleeve 76 in FIGURE 4 or the outer shaft 128 in FIGURE 8, by chain and sprocket devices 217. Accordingly, the arrangement appearing in FIGURE 12 permits mounting of the collector ring assembly 93 (FIGURE 4) or 93A (FIGURE 8) at either end of the shaft means, since the ends of the shaft means are not involved in the power coupling between the spring motors 216 and said shaft means.

In the reel structures 205 and 215 of FIGURES 11 and 12, respectively, reduction means can be used to increase or decrease the effective part of the spring motors being used and such reduction can be made adjustable.

*Operation*

By reference to the foregoing descriptive materials with respect to the reel 10 and the reel 125, it will be seen that the only major differences therebetween reside in the location of their respective collector ring assemblies and the specific details of their shaft constructions. In each instance, the housing of the spring motor is held against rotation with respect to its base member. The sleeves of the reel 10 and the outer shaft of the reel 125 are caused to rotate by unwinding movement of their spools, which is resiliently and increasingly opposed by the springs in the spring motors. In one instance, the collector ring assembly 93 is mounted upon the motor housing 58, and in the other instance the collector ring assembly 93A is mounted upon the spool-supporting drum 132. Thus, the collector ring housing 94 and brushes 112 remain stationary in reel 10, while the collector rings 109 rotate. In the reel 125, however, the brushes 112A rotate around the collector rings 109A which are stationary.

Any one of the component parts of the reels 10, 125, 142, 205 and 215, including the spool, the drum, the collector ring assembly, the spring motor and/or the shaft can be quickly and easily removed and replaced merely by removing a few bolts or by loosening set screws. Thus, a damaged or defective component part can be removed and replaced by a new component in a few minutes and right on the job.

Although particularly preferred embodiments of the invention have been disclosed in detail above for illustrative purposes, it will be understood that variations or modifications of such disclosure, which come within the scope of the appended claims, are fully contemplated.

The embodiments of the invention in which an exclusive property or privilege is claimed are defined as follows:

1. A reel construction for an electrical cable, comprising:

a base member;

shaft means having inner and outer, concentric hollow shafts, the outer shaft being rotatably mounted upon and supported by said base member and having opposite ends thereof extending away from said base member;

drum means mounted upon and rotatable with said shaft means on one side of said base member;

spool means secured upon said drum means for rotation therewith;

spring motor means having a housing removably and fixedly connected to said base member and coil spring means within said housing connected at one end thereof to said housing and at the other end thereof to said shaft means, whereby rotation of said shaft means in one direction is resiliently resisted;

a collector ring assembly removably mounted upon one of said drum means and said spring housing, a first portion of said collector ring assembly being rotatable with respect to the inner shaft and a second portion of said collector ring assembly normally being nonrotatable with respect to said inner shaft, said drum means and said spring means being attached to the outer shaft;

first and second conductor means electrically connected to said collector ring assembly, one of said conductor means being wound upon said spool means in the direction of said rotation.

2. A reel construction according to claim 1, wherein said collector ring assembly is connected to said spring motor housing; and wherein said second conductor means extends through said shaft means and is wound upon said spool means.

3. A reel construction according to claim 1, wherein said first conductor means extends through said inner shaft, and the second conductor means is wound upon said spool means.

4. A reel construction according to claim 1, wherein said spring motor means comprises a plurality of spring motors each having a housing, a spring retainer rotatably supported within said housing, a sleeve shaft rotatably supported upon said outer shaft and a coil spring connected between said spring retainer and said sleeve shaft, said sleeve shaft of one spring motor being connected to the spring retainer of another spring motor whereby said motors are connected in series with each other between said outer shaft and said base member; and wherein said inner and outer shafts are comprised of sections having disengageable coupling means at their adjacent ends for effecting simultaneous rotation of the sections in each shaft so that rotation of said drum means is resiliently opposed by said coil springs and each of said spring motors has a corresponding outer shaft section and inner section removable therewith.

5. A structure according to claim 1, wherein said spring motor means comprises plural spring motors connected in parallel between said outer shaft and said base member, said motors having housings rigidly and removably held in fixed positions with respect to said base member and being interchangeable.

6. A reel construction according to claim 1, wherein said outer shaft comprises a plurality of sleeves mounted upon said inner shaft in abutting relationship, said sleeves having releasable coupling means on their adjacent ends for effecting simultaneous rotation thereof.

7. A reel construction according to claim 6, wherein a first one of said sleeves is rotatably supported by said base member and is secured to said drum means;
wherein a second one of said sleeves is secured to one end of said coil spring means and rotatably supports said housing; and
wherein a third one of said sleeves extends through said collector ring assembly and is secured to a portion thereof.

References Cited
UNITED STATES PATENTS

| | | | |
|---|---|---|---|
| 2,645,432 | 7/1953 | Griffitts | 191—12.2 |
| 3,033,488 | 5/1962 | Weber | 191—12.2 |
| 3,040,139 | 6/1962 | Appleton | 191—12.2 |

ARTHUR L. LA POINT, *Primary Examiner.*

S. T. KRAWCZEWICZ, *Assistant Examiner.*